United States Patent
Heinrich et al.

(10) Patent No.: US 7,431,138 B2
(45) Date of Patent: Oct. 7, 2008

(54) START-UP CLUTCH ASSEMBLY

(75) Inventors: Johannes Heinrich, Friedrichsdorf (DE); Hans Juergen Hauck, Karlsruhe (DE); Michael Schaefer, Schwetzinger (DE)

(73) Assignee: BorgWarner Inc., Auburn Hills, MI (US)

( * ) Notice: Subject to any disclaimer, the term of this patent is extended or adjusted under 35 U.S.C. 154(b) by 260 days.

(21) Appl. No.: 11/146,535

(22) Filed: Jun. 7, 2005

(65) Prior Publication Data

US 2005/0284722 A1 Dec. 29, 2005

(30) Foreign Application Priority Data

Jun. 24, 2004 (DE) .................... 10 2004 030 660

(51) Int. Cl.
*F16D 25/0638* (2006.01)
(52) U.S. Cl. ............... 192/85 AA; 192/55.61; 192/70.12; 192/70.17; 192/106 F
(58) Field of Classification Search ............... 192/106 F
See application file for complete search history.

(56) References Cited

U.S. PATENT DOCUMENTS

| | | | |
|---|---|---|---|
| 1,233,561 A | 7/1917 | Dornfeld | |
| 2,174,395 A | 9/1939 | Aikman | 188/153 |
| 2,639,013 A | 5/1953 | Meschia | 192/70.22 |
| 2,919,778 A | 1/1960 | Aschauer | 192/86 |
| 2,939,558 A * | 6/1960 | Schjolin | 192/3.52 |
| 3,171,522 A | 3/1965 | Petrie et al. | 192/69 |
| 3,534,842 A | 10/1970 | Davison, Jr. | 192/113 |
| 3,537,556 A | 11/1970 | Pfeffer | 192/70.28 |
| 3,612,237 A | 10/1971 | Honda | 192/85 |
| 3,654,692 A | 4/1972 | Goetz | 29/558 |
| 3,823,802 A * | 7/1974 | Winzeler et al. | 192/106 F |
| 3,834,503 A | 9/1974 | Maurer et al. | 192/113 |
| 3,858,698 A | 1/1975 | Hause | 192/89 |
| 3,863,746 A * | 2/1975 | Schulz | 192/106 F |
| 4,081,065 A | 3/1978 | Smyth et al. | 192/76 |
| 4,205,739 A | 6/1980 | Shelby et al. | 192/113 |
| 4,219,246 A | 8/1980 | Ladin | 308/219 |
| 4,270,647 A | 6/1981 | Leber | 192/113 |
| 4,301,904 A | 11/1981 | Ahlen | 192/70.12 |
| 4,361,060 A | 11/1982 | Smyth | 74/866 |
| 4,372,434 A | 2/1983 | Aschauer | 192/85 |

(Continued)

FOREIGN PATENT DOCUMENTS

DE 871 857 7/1949

(Continued)

*Primary Examiner*—Richard M. Lorence
(74) *Attorney, Agent, or Firm*—Bliss McGlynn, P.C.

(57) ABSTRACT

A start-up clutch including a disk clutch having an outer disk carrier and an inner disk carrier with a multi-disk clutch pack disposed therebetween. The multi-disk clutch pack is adapted to engage and provide torque translation between the inner and the outer carriers. A piston is adapted to be actuated by fluid pressure to cause the multi-disk clutch pack to engage. A first cavity is adapted to be selectively supplied with pressurized fluid to actuate the piston. A second cavity is adapted to be selectively supplied with pressurized fluid to provide cooling to the multi-disk clutch pack. A first fluid passage adapted to provide pressurized fluid to the first cavity, and a second fluid passage is adapted to provide pressurized fluid to the second fluid passage.

2 Claims, 3 Drawing Sheets

U.S. PATENT DOCUMENTS

| | | | | |
|---|---|---|---|---|
| 4,501,676 A | 2/1985 | Moorhouse | ................. | 252/12 |
| 4,548,306 A | 10/1985 | Hartz | ..................... | 192/70.28 |
| 4,646,891 A | 3/1987 | Braun | ..................... | 192/0.032 |
| 4,667,534 A | 5/1987 | Kataoka | ..................... | 74/711 |
| 4,667,798 A | 5/1987 | Sailer et al. | ............... | 192/70.12 |
| 4,700,823 A | 10/1987 | Winckler | ................... | 192/107 |
| 4,802,564 A | 2/1989 | Stodt | ...................... | 192/70.28 |
| 4,808,015 A | 2/1989 | Babcock | ................... | 384/609 |
| 4,827,784 A | 5/1989 | Muller et al. | ................ | 74/330 |
| 5,172,799 A * | 12/1992 | Iijima et al. | .............. | 192/106 F |
| 5,174,420 A | 12/1992 | DeWald et al. | ............. | 188/264 |
| 5,232,411 A | 8/1993 | Hayashi et al. | ............ | 475/146 |
| 5,275,267 A | 1/1994 | Slicker | .................... | 192/0.033 |
| 5,284,232 A | 2/1994 | Prud'Homme | ........... | 192/70.21 |
| 5,305,863 A | 4/1994 | Gooch et al. | ............. | 192/70.12 |
| 5,383,544 A | 1/1995 | Patel | ...................... | 192/70.28 |
| 5,439,088 A | 8/1995 | Michioka et al. | ............. | 192/85 |
| 5,450,934 A | 9/1995 | Maucher | ................. | 192/70.25 |
| 5,469,943 A | 11/1995 | Hill et al. | .................... | 188/264 |
| 5,495,927 A | 3/1996 | Samie et al. | ............. | 192/70.12 |
| 5,499,704 A | 3/1996 | Hays | ..................... | 192/89.23 |
| 5,505,286 A | 4/1996 | Nash | ..................... | 192/70.27 |
| 5,538,121 A | 7/1996 | Hering | .................... | 192/70.12 |
| 5,577,588 A | 11/1996 | Raszkowski | ........... | 192/113.35 |
| 5,613,588 A | 3/1997 | Vu | ........................ | 192/113.35 |
| 5,634,541 A | 6/1997 | Maucher | ................. | 192/70.25 |
| 5,755,314 A | 5/1998 | Kanda et al. | ............. | 192/70.12 |
| 5,813,508 A * | 9/1998 | Shoji et al. | ............. | 192/113.34 |
| 5,899,310 A | 5/1999 | Mizuta | ...................... | 192/107 |
| 5,908,100 A | 6/1999 | Szadkowski et al. | ..... | 192/214.1 |
| 5,918,715 A | 7/1999 | Ruth et al. | .................... | 192/46 |
| 6,000,510 A | 12/1999 | Kirkwood et al. | .......... | 192/3.29 |
| 6,026,944 A | 2/2000 | Satou et al. | ............. | 192/70.28 |
| 6,071,211 A | 6/2000 | Liu et al. | ................... | 477/175 |
| 6,116,397 A | 9/2000 | Kosumi et al. | ........... | 192/89.23 |
| 6,189,669 B1 | 2/2001 | Kremer et al. | ........... | 192/70.12 |
| 6,217,479 B1 | 4/2001 | Brown et al. | ................... | 477/86 |
| 6,244,407 B1 | 6/2001 | Kremer et al. | ........... | 192/70.12 |
| 6,299,565 B1 | 10/2001 | Jain et al. | ................... | 477/143 |
| 6,332,521 B1 * | 12/2001 | Shoji | ...................... | 192/55.61 |
| 6,419,062 B1 | 7/2002 | Crowe | ..................... | 192/89.23 |
| 6,454,074 B1 * | 9/2002 | Kundermann et al. | .... | 192/87.11 |
| 6,868,949 B2 | 3/2005 | Braford, Jr. | ............... | 192/55.61 |
| 2002/0014386 A1 | 2/2002 | Diemer et al. | ........... | 192/70.14 |
| 2003/0057051 A1 | 3/2003 | Alfredsson | ................ | 192/87.15 |
| 2003/0075413 A1 | 4/2003 | Alfredsson | ................ | 192/87.15 |
| 2003/0178275 A1 | 9/2003 | Breier et al. | ................ | 192/3.29 |
| 2004/0050647 A1 * | 3/2004 | Hayabuchi et al. | .......... | 192/212 |
| 2004/0060793 A1 | 4/2004 | Dacho et al. | ............... | 192/3.29 |
| 2005/0224308 A1 * | 10/2005 | Hauck et al. | ............. | 192/70.12 |

FOREIGN PATENT DOCUMENTS

| | | |
|---|---|---|
| DE | 953 406 | 11/1956 |
| DE | 1 217 800 | 5/1966 |
| DE | 31 18 565 A1 | 11/1982 |
| DE | 3149 880 C2 | 4/1985 |
| DE | 35 32 759 C1 | 3/1987 |
| DE | 0 762 009 A1 | 3/1997 |
| DE | 198 21 164 A1 | 11/1999 |
| DE | 100 34 677 A1 | 2/2002 |
| DE | 100 49 474 A1 | 4/2002 |
| DE | 197 00 635 C2 | 6/2002 |
| DE | 101 15 454 A1 | 8/2002 |
| DE | 101 43 834 A1 | 3/2003 |
| EP | 0 848 179 A1 | 6/1998 |
| FR | 2123828 | 9/1972 |
| FR | 2597941 * | 10/1987 |
| JP | 62052249 A * | 3/1987 |
| JP | 4-366032 A | 12/1992 |
| JP | 8-200393 A | 8/1996 |
| WO | WO 99/45289 | 9/1999 |

* cited by examiner

START-UP CLUTCH ASSEMBLY

BACKGROUND OF THE INVENTION

1. Field of the Invention

The present invention relates, generally, to a clutch assembly, and more specifically, to a start-up clutch assembly for translating torque between a prime mover and a transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive power demand of the vehicle. Hydrokinetic devices, such as torque converters, are often employed between the internal combustion engine and its associated automatic transmission for transferring kinetic energy therebetween.

Torque converters typically include impeller assemblies that are operatively connected for rotation with the torque input from an internal combustion engine, a turbine assembly that is fluidly connected in driven relationship with the impeller assembly, and a stator or reactor assembly. These assemblies together form a substantially toroidal flow passage for kinetic fluid that circulates in the torque converter. Each assembly includes a plurality of blades or veins that act to convert mechanical energy to hydrokinetic energy and back to mechanical energy. The stator assembly of a conventional torque converter is locked against rotation in one direction but is free to spin about an axis in the direction of rotation of the impeller assembly and the turbine assembly. When the stator assembly is locked against rotation, the torque is multiplied by the torque converter. During torque multiplication, the output torque is greater than the input torque for the torque converter. However, when the stator assembly freewheels in the direction of rotation of the impeller and turbine assemblies, there is no torque multiplication and the torque converter becomes a fluid coupling. Fluid couplings have inherent slip. In the absence of a fully engaged lock-up clutch, torque converter slip exists when the speed ratio is less than 1.0 (RPM input>RPM output of the torque converter). This inherent slip reduces the efficiency of the torque converter.

While torque converters provide a smooth coupling between the engine and the transmission, the slippage of the torque converter results in parasitic losses that decrease the efficiency of the entire power train. More specifically, the operating efficiency of the converter during start-up is relatively low. It varies from a zero value at stall to a maximum value of approximately 80-85% at the coupling point. The coupling point occurs at the transition from the torque multiplication mode to the coupling mode when the torque multiplication ratio is unity.

In addition to the problems with efficiency, torque converters of the type known in the related art occupy substantial space in the driveline assembly between the transmission gearing and the engine. Torque converters typically define relatively large diameters when compared to the transmission gearing. Further, the torque converter has a substantial rotating mass that must be accelerated by the engine during start-up of the vehicle during forward drive or in reverse drive. The effective mass of the converter necessarily includes the mass of the hydraulic fluid that circulates in the torus circuit defined by the converter impeller, the turbine, and the stator assembly.

On the other hand, frictional clutches have been also employed in the related art to selectively connect a source of rotational power, such as the crank shaft of an internal combustion engine and its flywheel, to a driven mechanism, such as a transmission. The frictional clutches of the type that have been employed in the related art overcome the disadvantages associated with reduced efficiencies, parasitic losses, relatively large effective mass and the space that is occupied by torque converters used for the same purpose. In an automotive context, clutches used for this purpose are often referred to as "start-up" clutches. Clutches of this type typically include a clutch pack that is operatively supported between a drive and driven member of the clutch assembly. The clutch pack typically incorporates a first set of clutch disks operatively connected to a drive member and a second set of clutch disks that are alternately disposed between the first set of disks and are operatively connected to a driven member. In operation, the two sets of disks are operatively forced together to form a frictional connection to transfer torque between the drive member and the driven member. The drive member is operatively connected to the torque input from the prime mover. The driven member is operatively connected to the input shaft of the transmission.

In addition, some start-up clutches include a series connected, torsional-vibration damper disposed between the clutch pack and the output to the input of the transmission. The torsional-vibration damper serves as an elastic coupling between the two main components of drive train of a vehicle (i.e., the engine and the transmission). Such devices reduce or otherwise prevent vibrations from being transmitted from the engine to other parts of the drive train.

While start up clutch assemblies having a clutch pack to transfer torque of the type generally known in the related art have performed reasonably well for their intended purposes, some disadvantages remain. More specifically, the disks of the start up clutches generate a good deal of heat as they are brought into engagement. Furthermore, as the overall structure of start up clutch assemblies move to smaller more efficient designs, the clutch packs are generally smaller requiring them to dissipate even greater quantities of heat energy. Some attempts have been made to improve the supply and flow of cooling oil within the clutch housing. However, changes in the supply of cooling oil within the clutch housing to compensate for heat have often caused other issues relating to the pressure balance of cooling oil between the drive and driven side components. Uncompensated pressure differences of this nature can cause uncontrolled slipping or uncontrolled engagement of the clutch disks.

In particular, a hydraulically controlled piston is actuated to cause the engagement of the clutch pack. Generally speaking, the actuating piston is dynamically balanced as it has oil on both sides. The actuating side is supplied with oil under actuating pressure and the opposite side has a supply of oil for cooling the friction surface of the friction elements. However, during the start-up procedure, conditions arise in which the actuating piston becomes partially unbalanced due to centrifugal force acting upon the cooling oil supply by the driven components. This is due to the fact that, during the start-up procedure, the two halves of the system (drive and driven) operate at different rotational speeds. The components of the input or drive side are rotating at engine speed, with the output or transmission side generally stationary. As a result, the fluid on the drive side of the actuating piston will be given an increase in pressure by the centrifugal effect of the drive member components.

If, from a rotational standpoint, the actuating piston is positioned on the driven or transmission side, the increase of forces from the oil area on the motor side reduce the effective engagement force causing uncontrolled and undesired slipping in the clutch pack. If, the actuating piston is positioned on the drive or engine side, it moves with engine speed and the centrifugal increase of oil pressure may cause the clutch pack to engage too rapidly.

Accordingly, there remains a need in the related art for a start-up clutch assembly that provides a supply and flow of cooling oil to the clutch disks to efficiently dissipate the frictional heat output while providing compensation for the increase in cooling oil pressure due to the centrifugal force of the drive components.

SUMMARY OF THE INVENTION

The disadvantages of the related art are overcome by the start-up clutch of the present invention including a disk clutch having an outer disk carrier and an inner disk carrier with a multi-disk clutch pack disposed therebetween. The multi-disk clutch pack is adapted to engage and provide torque translation between the inner and the outer carriers. A piston is adapted to be actuated by fluid pressure to cause the multi-disk clutch pack to engage. A first cavity is adapted to be selectively supplied with pressurized fluid to actuate the piston. A second cavity is adapted to be selectively supplied with pressurized fluid to provide cooling to the multi-disk clutch pack. A first fluid passage provides pressurized fluid to the first cavity, and a second fluid passage provides pressurized fluid to the second cavity.

In this manner, the disadvantages and drawbacks of the related art are overcome by the present invention, which includes two separate flow passages and two fluid cavities. Thus, the present invention provides a supply and flow of cooling oil to the clutch disks to efficiently dissipate the frictional heat output while providing compensation for the increase in cooling oil pressure due to the centrifugal force of the drive components.

Other objects, features, and advantages of the present invention will be readily appreciated, as the same becomes better understood after reading the subsequent description taken in connection with the accompanying drawings

DETAILED DESCRIPTION OF THE PREFERRED EMBODIMENT(S)

Figure 1:
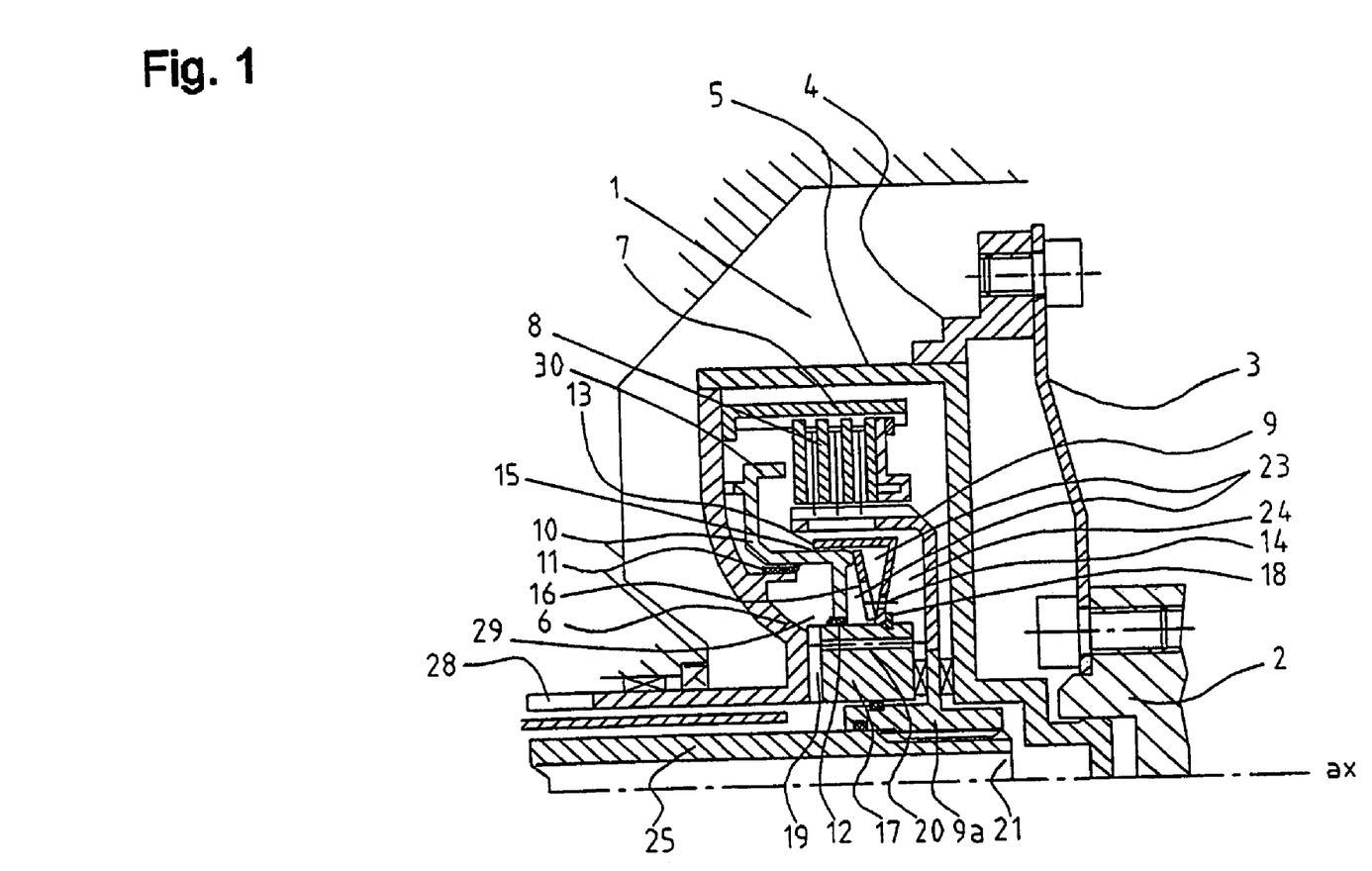
FIG. 1 is a cross sectional side view of a first embodiment of the start-up clutch assembly of the present invention.

The present invention relates, generally, to a clutch assembly, and more specifically, to a start-up clutch assembly for translating torque between a prime mover and a transmission. FIG. 1 illustrates one embodiment of the start-up clutch assembly, generally indicated at 1, in accordance with the invention were like numerals are used to designate like structure throughout the figures. The torque input is provided from the crankshaft 2 of a motor or prime mover (not shown) having an axis of rotation (ax). A first half 5 of an outer casing of the clutch 1 is operatively connected to a flex plate or flywheel 3 through a plurality of assembly eyes 4 that are mounted to the first half 5 of the outer casing. The first half 5 of the outer casing is fixedly mounted to the second half 6 of the outer casing. The clutch 1 includes an outer disk carrier 7 and an inside disk carrier 9. The outer disk carrier 7 and inside disk carrier 9 are pivoted against each other around the axis of rotation (ax). Both disk carriers 7 and 9 are designed as half shells that include opposing alternately arranged clutch disks forming a multi-disk clutch pack 8. The outer disk carrier is operatively mounted to the second half 6 of the outer casing of the clutch 1 and the inner disc carrier 9 is operatively connected to an output hub 9a and the input shaft 25 of the transmission (not shown).

By means of an actuating piston 10, it is possible to frictionally engage the clutch pack 8 to cause torque translation between the outer and inner disk carriers 7 and 9. The piston 10 is kept in a non-actuated state due to the spring force of a disk return spring 16. It should be appreciated that the two sets of clutch disks may be formed of any of variety of structurally hard and resilient materials such as steel or other metallic alloys. In the preferred embodiment, the disks operatively mounted to the outer carrier 7 are steel and the disks operatively mounted to the inner carrier 9 include a friction material.

To actuate the piston 10, a first cavity 29 is adapted to be selectively supplied with pressurized fluid. More specifically, the actuation piston 10 is supported and sealed to a hub 17 by ring seal 12 and further supported and sealed to the second half of the outer casing 6 by ring seal 11. The ring seals 11 and 12 provide the first cavity or actuating chamber 29 that is selectively supplied with pressurized cooling fluid or oil through a first fluid passage. In the embodiment illustrated in FIG. 1, the first fluid passage is the supply or main passage 19.

Further, a second cavity 24 is provided that is adapted to be selectively supplied with pressurized fluid to provide cooling to the multi-disk clutch pack 8. The second cavity 24 is supplied with pressurized fluid by a second fluid passage 20. The second cavity 24 is rotationally influenced by the inner disk carrier 9 and is thus on the driven side of the clutch assembly 1. A separating or shielding plate 13 is operatively disposed in the second cavity 24. The separating plate 13 and the disk return spring 16 are held to the hub 17 by a retaining ring 18. The separating plate 13 is adapted to further isolate the first cavity 29 and the movement of the actuating piston 10 from the second cavity 24. The separating plate 13 further includes a compensating opening 14 and a gap 15 above the actuating piston 10, which cooperate to form compensating cavities 23.

Supply passage 19 is normally pressurized to provide a flow of cooling oil to the second cavity 24 through the second fluid passage 20 to dissipate heat generated in the clutch disks of the clutch pack 8. When actuation pressure is selectively supplied through supply passage 19, the actuation plate 10 is pressed against the clutch pack 8 to frictionally engage the disks. Since the drive side components are rotating at engine speed, the flow of cooling oil supplied to the actuating cavity 29 is subject to the centrifugal forces of the drive components. Thus, the centrifugal force causes additional pressure to be undesirably added to the first cavity 29.

Since the second fluid passage 20 is branched off of the supply passage 19, the pressure and flow to the second cavity 24 will also increase. However, since the second passage 20 is generally of a smaller diameter, the increase will provide additional cooling to the clutch pack 8, but will not balance the additional pressure on the drive side due to the centrifugal forces of the drive components. To provide a balance, or compensation for the additional centrifugal force pressure in the actuating cavity 29, the compensating cavities 23 partially act against the movement of the actuating piston 10. Normally, the compensating chambers 23 are fed by a portion of the cooling flow from the second cavity 24 through the compensating opening 14 so that cooling oil is maintained in these areas. When the actuating piston 10 is actuated and forced toward the separating plate 13, the compensating opening 14 and the gap 15 control how fast the cooling oil is forced out of the compensating areas 23 thereby controlling the actuating movement of the actuating piston 10 and compensating for the added pressure on the actuating piston 10. In this manner, the present invention includes two separate flow passages and two fluid cavities that are separated by a separating plate to provide compensation for the added centrifugal force pressure of the drive components while providing proper cooling to the clutch disks.

Figure 2:
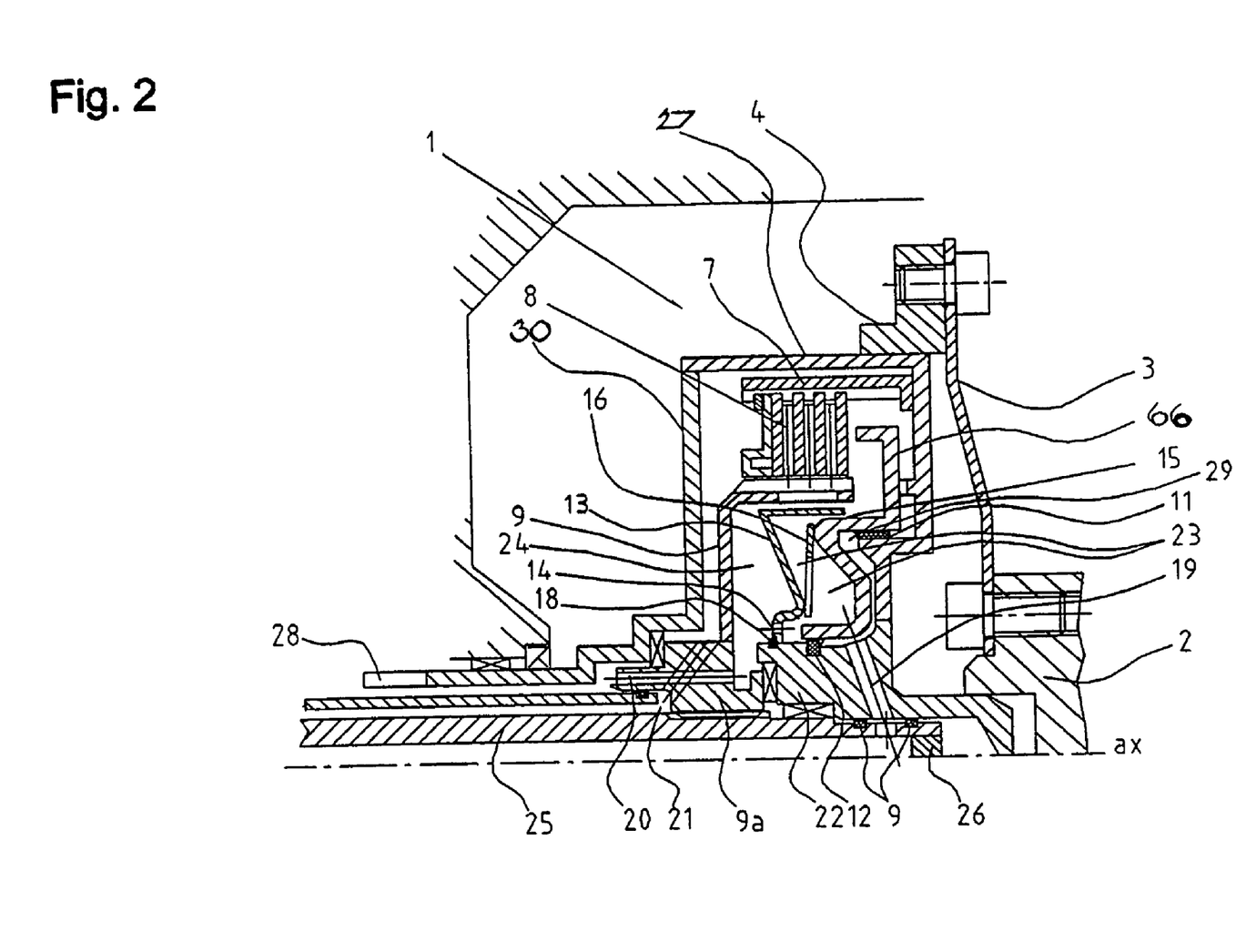
FIG. 2 is a cross sectional side view of a second embodiment of the start-up clutch assembly of the present invention.

Referring now to FIG. 2, another embodiment of the start-up clutch of the present invention is generally indicated at 1. In this embodiment, a separate second fluid passage is employed for cooling oil rather than a branch passage as discussed with regard to the embodiment illustrated in FIG. 1. In a manner similar to that illustrated in FIG. 1, the clutch 1 of FIG. 2 derives a torque input from the crankshaft 2 of a motor or prime mover (not shown) having an axis of rotation (ax). A first half 27 of an outer casing of the clutch 1 is operatively connected to a flex plate or flywheel 3 through a plurality of assembly eyes 4 that are mounted to the first half 27 of the outer casing. The first half 27 of the outer casing is further fixedly mounted to the second half 30 of the outer casing. The clutch 1 includes an outer disk carrier 7 and an inside disk carrier 9. The outer disk carrier 7 and inside disk carrier 9 are pivoted against each other around the axis of rotation (ax). Both disk carriers 7 and 9 are designed as half shells that include opposing alternately arranged clutch disks forming a clutch pack 8. As shown in FIG. 2, the outer disk carrier is operatively mounted to the first half 27 of the outer casing and the inner disc carrier 9 is operatively connected to an output hub 9a and the input shaft 25 of the transmission (not shown).

By means of an actuating piston 66, it is possible to frictionally engage the clutch pack 8 to cause torque translation between the outer and inner disk carriers 7 and 9. The piston 66 is kept in a non-actuated state due to the spring force of a disk return spring 16. It should be appreciated that the two sets of clutch disks may be formed of any of variety of structurally hard and resilient materials such as steel or other metallic alloys. In the preferred embodiment, the disks operatively mounted to the outer carrier 7 are steel and the disks operatively mounted to the inner carrier 9 include a friction material.

In FIG. 2, to actuate the piston 66, a first cavity 29 is adapted to be selectively supplied with pressurized fluid. More specifically, the actuating piston 66 in FIG. 2 is supported and sealed to a hub 22 by ring seal 12 and further supported and sealed to the first half 27 of the outer casing by ring seal 11. The ring seals 11 and 12 provide the first cavity 29 that is selectively pressurized by cooling oil through a first passage 19 and the center of the transmission input shaft 25. The input shaft 25 also includes an end plug 26.

A second cavity 24 is selectively supplied with pressurized fluid to provide cooling to the multi-disk clutch pack. The second cavity 24 is supplied with pressurized fluid by a second and separate fluid passage 20. The cooling oil moves thorough the clutch and returns through return passage 21. The first cavity 29 is rotationally influenced by the second half 30 of the outer casing and is thus on the driven side of the clutch assembly 1. A separating or shielding plate 13 is operatively disposed in the second cavity 24. The separating plate 13 and the disk return spring 16 are held to the hub 17 by a retaining ring 18. The separating plate 13 is adapted to further isolate the first cavity 29 and the movement of the actuator piston 66 from the second cavity 24. The separating plate 13 further includes a compensating opening 14 and a gap 15 above the actuating piston 66, which cooperate to form compensating cavities 23.

Supply passage 19 is normally pressurized to provide a flow of cooling oil to the second cavity 24 through the second fluid passage 20 to dissipate heat generated in the clutch disks of the clutch pack 8. When actuation pressure is selectively supplied through supply passage 19, the actuation plate 66 is pressed against the clutch pack 8 to frictionally engage the disks. Since the drive side components are rotating at engine speed, the flow of cooling oil supplied to and in the first cavity 29 is subject to the centrifugal forces of the drive components. Thus, the centrifugal force causes additional pressure to be undesirably added to the first cavity 29.

In response to the actuation of the clutch pack 8, the pressure and flow to the second cavity 24 for cooling will also be increased. However, it is generally not practical to increase the cooling flow to attempt to balance the additional pressure on the drive side due to the centrifugal forces of the drive components. To provide a balance, or compensation for the additional centrifugal force pressure in the first or actuating cavity 29, the compensating cavities 23 partially act against the movement of the actuating piston 66. Normally, the compensating chambers 23 are fed by a portion of the cooling flow from the second cavity 24 so that cooling oil is maintained in these areas. When the actuating piston 66 is actuated and forced toward the separating plate 13, the compensating opening 14 and the gap 15 control how fast the cooling oil is forced out of the compensating areas 23 thereby controlling the actuating movement of the actuating piston 66 and compensating for the added pressure on the actuating piston 66. In this manner, the present invention includes two separate flow passages and two fluid cavities that are separated by a separating plate to provide compensation for the added centrifugal force pressure of the drive components while providing proper cooling to the clutch disks.

Figure 3:
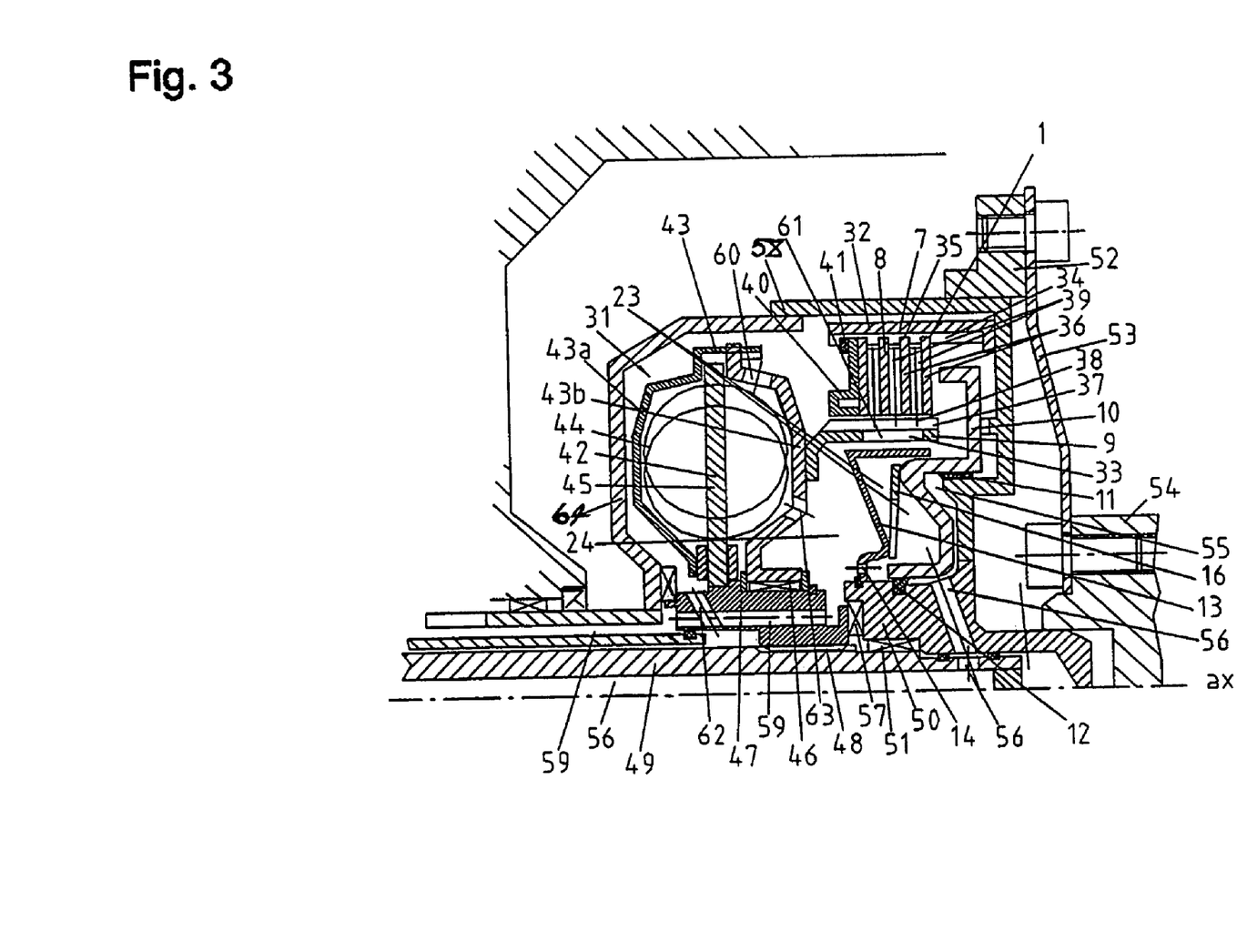
FIG. 3 is a cross sectional side view of a third embodiment of the start-up clutch assembly of the present invention that further includes a torsional-vibration damper.

Referring now to FIG. 3, a third embodiment of the start-up clutch of the present invention is generally indicated at 1 that further includes a torsional vibration damper generally indicated at 31. In a manner similar to the embodiments discussed above, the start-up clutch 1 illustrated in FIG. 3 includes an outer disk carrier 7 as well as an inner disk carrier 9. Outer disk carrier 7 and inner disk carrier 9 are pivoted against each other around an axis of rotation (ax). Both disc carriers 7 and 9 are designed as half shells including cylindrical areas 32 and 33. At its inner perimeter, the cylindrical area 32 of the outer disk carrier 7 has an internal tooth system 34. A corresponding external tooth system 35 on the outer disks 36 engages the outer disk carrier 7. In a similar manner, the cylindrical area 33 of the inner disk carrier 9 has an internal tooth system 37 that corresponds to the external tooth system 37 that corresponds to the internal tooth system 38 on the inner disks 39. An end plate 40 is held by a retaining ring 41 that supports the disks at one end of the clutch pack 8. It should be appreciated that the two sets of clutch disks may be formed of any of variety of structurally hard and resilient materials such as steel or other metallic alloys. In the preferred embodiment, the outer disks 36 are steel and the inner disks 38 include a friction material.

The torsion vibration damper 31 includes a secondary element 42 in the shape of a disk and a primary element 43 having two half shells 43a and 43b. The secondary 42 and primary elements 43a, 43b are coupled with each other by means of a spring damping arrangement. The primary element 43b is disposed upon a needle bearing 46 about a damper hub 47. The spring damper arrangement consists of a plurality of coil springs 44 arranged circumferentially in openings formed in the primary and secondary elements 42, 43. The ends of the each of the plurality of coil springs 44 engage both the radial portions 45 of the secondary elements 42 and shoes or spring divisors in the primary elements 43a and 43b (not shown).

The inner disk carrier 9 is in torque-proof connection with the primary element 43b of the torsion vibration damper 31 and the secondary element 42 is in torque-proof connection with the transmission input shaft 49 by a splined interaction at 48. A clutch hub 50 supports the first half casing 58 and is disposed upon a needle bearing 51 about the transmission input shaft 49. The outer disk carrier 7 is fixedly mounted to the first half casing 58. The first half casing 58 is further connected to the torque input through a plurality of assembly eyes 52, a flex disk 53, and the engine crankshaft 54.

By means of an actuating piston 10, it is possible to frictionally engage the clutch pack 8 to cause torque translation between the outer and inner disk carriers 7 and 9. The piston 10 is kept in a non-actuated state due to the spring force of a disk return spring 16. To actuate the piston 10, a first cavity 55 is adapted to be selectively supplied with pressurized fluid. More specifically, the actuating piston 10 is supported and sealed to the clutch hub 50 by ring seal 12 and further supported and sealed to the first half 58 of the outer casing by ring seal 11. The ring seals 11 and 12 provide the first cavity or actuating chamber 55 that is selectively supplied with pressurized cooling fluid or oil through a first fluid passage 56.

A second cavity 24 is selectively supplied with pressurized fluid to provide cooling to the multi-disk clutch pack. The second cavity 24 is supplied with pressurized fluid by a second fluid passage 59. Openings 60, 61, and 63 in the primary element 43 of the damper 31 as well as in the inner disk carrier 9 allow for largely homogeneous fluid distribution through the damper 31 and clutch pack 8. An outlet passage 62 provides a return path for the cooling oil from the closed casing 58, 64. A separating plate 13 is operatively disposed in the second cavity 24. The first cavity 55 is rotationally influenced by the first half 58 of the casing and is thus on the driven side of the clutch assembly 1. A separating or shielding plate 13 is operatively disposed in the second cavity 24. The separating plate 13 and the disk return spring 16 are held to the hub 50 by a retaining ring. The separating plate 13 is adapted to further isolate the first cavity 55 and the movement of the actuator piston 10 from the second cavity 24. The separating plate 13 also includes a compensating opening 14 and a gap above the actuating piston 10, which cooperate to form compensating cavities 23.

Second fluid passage 59 is normally pressurized to provide a flow of cooling oil to the second cavity 24 to dissipate heat generated in the clutch disks of the clutch pack 8. When actuation pressure is selectively supplied through supply passage 56, the actuating piston 10 is pressed against the clutch pack 8 to frictionally engage the disks. Since the drive side components are rotating at engine speed, the flow of cooling oil supplied to the first, or actuating cavity 55 is subject to the centrifugal forces of the drive components. Thus, the centrifugal force causes additional pressure to be undesirably added to the first cavity 55. In response to the actuation of the clutch pack 8, the pressure and flow to the second cavity 24 for cooling will also be increased. However, it is generally not practical to increase the cooling flow to attempt to balance the additional pressure on the drive side due to the centrifugal forces of the drive components. To provide a balance, or compensation for the additional centrifugal force pressure in the first or actuating cavity 55, the compensating cavities 23 partially act against the movement of the actuating piston 10.

Normally, the compensating chambers 23 are fed by a portion of the cooling flow through the compensating opening 14 from the second cavity 24 so that cooling oil is maintained in these areas. When the actuating piston 10 is actuated and forced toward the separating plate 13, the compensating opening 14 and the gap control how fast the cooling oil is forced out of the compensating areas 23 thereby controlling the actuating movement of the actuating piston 10 and compensating for the added pressure on the actuating piston 10.

In this manner, the present invention includes two separate flow passages and two fluid cavities that are separated by a separating plate to provide compensation for the added centrifugal force pressure of the drive components while providing proper cooling to the clutch disks. Thus, the present invention provides a supply and flow of cooling oil to the clutch disks to efficiently dissipate the frictional heat output while providing compensation for the increase in cooling oil pressure due to the centrifugal force of the drive components.

It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:
1. A start-up clutch assembly comprising:
a disk clutch having an outer disk carrier and an inner disk carrier with a multi-disk clutch pack disposed therebetween, said multi-disk clutch pack adapted to engage to provide torque translation between said inner and said outer carriers;
a piston adapted to be actuated by fluid pressure to cause said multi-disk clutch pack to engage;
a disk-return spring defining a spring force and adapted to prevent actuation of said piston;
a first cavity adapted to be selectively supplied with pressurized fluid to actuate said piston;
a second cavity adapted to be selectively supplied with pressurized fluid to provide cooling to said multi-disk clutch pack;
a first fluid passage adapted to provide pressurized fluid to said first cavity;
a second fluid passage adapted to provide pressurized fluid to said second cavity, said first and second passages being branches of a main passage; and
a separator plate operatively disposed between said first and second cavities to isolate said first cavity from said second cavity, including a compensating opening, and juxtaposed to said piston so as to create a gap between said piston and said separator plate, wherein said compensating opening and said gap cooperate to form compensating cavities that are fed by a portion of said pressurized cooling fluid from said second cavity through said compensating opening and partially act against movement of said piston to provide compensation for additional centrifugal-force pressure in said first cavity and wherein said compensating opening and said gap further are adapted to control actuation of said piston toward said separator plate and compensate for centrifugal forces of drive components of said disk clutch upon said piston by controlling how fast said pressurized cooling fluid is forced out of said compensating cavities.
2. A start-up clutch assembly comprising:
a disk clutch having an outer disk carrier and an inner disk carrier with a multi-disk clutch pack disposed therebe- tween, said multi-disk clutch pack adapted to engage to provide torque translation between said inner and said outer carriers;

a piston adapted to be actuated by fluid pressure to cause said multi-disk clutch pack to engage;

a disk-return spring defining a spring force and adapted to prevent actuation of said piston;

a first cavity adapted to be selectively supplied with pressurized fluid to actuate said piston;

a second cavity adapted to be selectively supplied with pressurized fluid to provide cooling to said multi-disk clutch pack;

a first fluid passage adapted to provide pressurized fluid to said first cavity;

a second fluid passage adapted to provide pressurized fluid to said second cavity, said first and second passages being branches of a main passage;

a separator plate operatively disposed between said first and second cavities to isolate said first cavity from said second cavity, including a compensating opening, and juxtaposed to said piston so as to create a gap between said piston and said separator plate, wherein said compensating opening and said gap cooperate to form compensating cavities and are adapted to control actuation of said piston toward said separator plate and compensate for centrifugal forces of drive components of said disk clutch upon said piston by controlling how fast said pressurized cooling fluid is forced out of said compensating cavities; and a torsional vibration damper having a primary element, a secondary element, and a spring dampening mechanism disposed between and operatively coupling said primary element and said secondary element, said torsional vibration damper connected in series to said disk clutch such that said torsional vibration damper and said disk clutch are juxtaposed to each other along a common axis.

* * * * *

UNITED STATES PATENT AND TRADEMARK OFFICE
CERTIFICATE OF CORRECTION

PATENT NO. : 7,431,138 B2
APPLICATION NO. : 11/146535
DATED : October 7, 2008
INVENTOR(S) : Heinrich et al.

It is certified that error appears in the above-identified patent and that said Letters Patent is hereby corrected as shown below:

On the Title Page, Item (75)

Inventors: delete "Hans Juergen Hauck, Karlsruhe (DE)" and insert therefor --Hans Juergen Hauck, Schwaebisch Hall (DE)--.

Inventors: delete "Michael Schaefer, Schwetzinger (DE)" and insert therefor --Michael Schaefer, Ketsch (DE)--.

Signed and Sealed this

Ninth Day of December, 2008

JON W. DUDAS
*Director of the United States Patent and Trademark Office*